United States Patent Office.

JOB ABBOTT, OF CANTON, OHIO ADMINISTRATOR OF THE ESTATE OF WILHELM MEYER, DECEASED.

*Letters Patent No. 86,962, dated February 16, 1869.*

IMPROVED COMPOUND FOR THE MANUFACTURE OF ARTIFICIAL MARBLE.

The Schedule referred to in these Letters Patent and making part of the same.

*To all whom it may concern:*

Be it known that WILHELM MEYER, of Berlin, Prussia, invented new and useful Compounds for the Manufacture of Artificial Marble; and that the following is a full, clear, and exact description of his invention.

The nature of said invention consists, first, in the preparation of a liquid compound, composed of several ingredients, which is made and compounded as is hereinafter set forth, which compound is used to prepare a second compound or sets of compounds, of form and appearance similar to putty, and this second compound, or several of these second compounds mixed together, forming, when dry, an artificial marble, of any desired form or color, and is of great practical value for furniture, and all the various purposes to which marble is applied, besides susceptible of many uses to which marble could not be practically applied.

To enable others skilled in the art to make and use this invention, he proceeded to describe its several ingredients, and the mode of preparing the several compounds.

The ingredients used in the preparation of the first-named liquid compound, with their proportions, are as follows:

Three (3) pounds of boiled linseed-oil.
One (1) pound ten (10) ounces of gum-dammar.
Six (6) ounces of iodide of potassium.
Twelve (12) ounces of rosin.
One half (½) pound of Venetian turpentine.
Six (6) pounds of the best lime, slaked or unslaked.
Nine (9) quarts of water.

Now, to prepare the compounds, take an iron vessel or kettle, and into this kettle put one half of the boiled linseed-oil, or one and one-half (1½) pound, together with the gum-dammar, iodide of potassium, rosin, and Venetian turpentine. Put this kettle over a slow fire, so arranged that the flames of the fire cannot get to the top of the kettle, and thus ignite the contents. As soon as the contents become hot, they should be stirred so as not to boil over, and this is continued until all of the contents become well melted and mixed together.

After this is done, strain the contents through a fine piece of muslin, taking care that the liquid which is strained through be put into a warm vessel, and be kept warm, so as not to congeal.

Then put the lime into a clean iron kettle or vessel, and pour the water into it, and put in the balance of the boiled linseed-oil. Put this kettle over a slow fire, and as soon as it gets hot, commence stirring it. If the lime is good, it will appear in long streaks upon stirring, and the stirring must be kept up until all of these streaks disappear, and the contents of the kettle are well cooked.

After this is done, the contents may be strained through muslin into the same vessel with the contents of the first kettle.

This mixture or compound should be stirred occasionally until it begins to grow cool, and to look like white foam. As soon as it presents this appearance, it should be put into a kettle and put over a slow fire, where it should be well stirred until it begins to grow thin.

This compound is then all ready for use, and is what is called the first, or liquid compound, in describing the nature of the invention in the first part of this specification, and forms the basis of the other compound, and of the marble itself.

To prepare the second, or putty-compound, as it may be termed, a quantity of the first compound is put into a suitable vessel, which should be warm, and enough fine whiting is added and stirred in to make, with the liquid compound, a stiff paste. This paste is then taken out on to a table, over which whiting has been sprinkled, and is thoroughly worked with the hands until it becomes like dough or putty.

To obtain any particular color for this compound, a quantity of the proper color, which has been ground fine and carefully sifted, so as to free it from any lumps, is put into a crock and mixed up to a paint with some of the liquid compound.

Then, as the kneading of the putty-compound is going on, this paint is to be added in small quantities, from time to time, and well worked in, until enough has been used to give the whole lump the desired color.

The quantity of color to be used in any particular case depends on the strength of color which the whole lump is to have, and is a matter of judgment for the workman.

The colors most commonly used are the finest Frankfort-black, zinc-white, mahogany-brown, chrome-yellow, and light and dark chrome-green.

This putty-compound should be worked in a room from 85° to 100° Fahrenheit temperature, as it gets stiff and hard in a colder room, and is hard to work.

If it is desired to make a marble of considerable specific gravity, some sulphate of baryta may be added to the lump while kneading it.

After the lump is well worked, and the color thoroughly worked in, so that the lump is free from any streaks, and of uniform color, it is wrapped up in a moderately wet cloth.

As many different colors may be prepared in this way as are wanted, and each and all of them, after being wrapped up in a wet cloth, are to be set away in a wooden vessel, which should also be covered with a wet cloth, so as to keep out the light.

They should be kept in a room which has a uniform temperature of about 75° Fahrenheit, and the cloths should be taken off and dampened as often as they get dry. In this manner, this compound, of any desired color, may be kept for a considerable time, and is always ready for use.

By having various colored compounds, any desired color of marble, or marble of a combination of colors, may be made at any time. The manner of making the marble with these compounds, and of working and finishing such marble, is fully shown in the specification for a patent on artificial marble, invented by the said WILHELM MEYER, and need not be given here.

Having thus fully set forth the ingredients, and mode of making the fluids and putty-compounds, he wished to be understood that, although he considered the proportions given, and this mode of compounding said ingredients, as the best known to him, yet he reserved the right to vary somewhat therefrom, without giving up his right to the compounds.

What he claimed as his invention, and desired to secure by Letters Patent, was—

1. The liquid compound, composed of the within-named ingredients, and compounded substantially in the manner herein set forth.

2. The combination of this liquid compound with fine chalk or whiting, or its equivalent, and with any desired color, for the purpose of forming a putty-compound for the manufacture of artificial marble, substantially as herein specified.

In testimony whereof, I have hereunto set my hand, in presence of two witnesses, this 18th day of December, A. D. 1868.

JOB ABBOTT,
*Administrator of Wilhelm Meyer.*

Witnesses:
A. M. STOUT,
CHAS. H. FLETCHER.